United States Patent
Wefers et al.

(10) Patent No.: US 8,255,311 B2
(45) Date of Patent: Aug. 28, 2012

(54) METHODS AND SYSTEMS FOR RISK EVALUATION

(75) Inventors: Marcus Wefers, Heidelberg (DE); Thomas Fleckenstein, Frankenthal (DE); Andreas Krecht, Grevenbroich (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/048,481

(22) Filed: Mar. 15, 2011

(65) Prior Publication Data

US 2011/0166907 A1 Jul. 7, 2011

Related U.S. Application Data

(62) Division of application No. 10/307,971, filed on Dec. 3, 2002, now Pat. No. 7,930,230.

(60) Provisional application No. 60/382,024, filed on May 22, 2002, provisional application No. 60/355,833, filed on Feb. 13, 2002.

(51) Int. Cl.
*G06Q 40/00* (2006.01)

(52) U.S. Cl. ............... 705/36; 705/35; 705/37; 705/38; 705/39; 705/44; 705/52; 705/3; 705/4; 707/999

(58) Field of Classification Search ............ 705/35–37, 705/7.26, 7.28, 4, 38, 3, 39, 44, 52; 707/999
See application file for complete search history.

(56) References Cited

U.S. PATENT DOCUMENTS

| | | | |
|---|---|---|---|
| 5,406,477 A | 4/1995 | Harhen | |
| 5,692,233 A | 11/1997 | Garman | |
| 6,223,143 B1 | 4/2001 | Weinstock et al. | |
| 6,233,143 B1 | 5/2001 | Gamble et al. | |
| 6,895,383 B2 | 5/2005 | Heinrich | |
| 7,006,992 B1 | 2/2006 | Packwood | |
| 7,113,914 B1 | 9/2006 | Spielmann et al. | |
| 7,130,779 B2 | 10/2006 | Beverina et al. | |
| 7,228,288 B2 | 6/2007 | Elliott | |
| 7,308,388 B2 | 12/2007 | Beverina et al. | |
| 7,359,865 B1 | 4/2008 | Connor et al. | |
| 7,542,881 B1 | 6/2009 | Billiotte et al. | |
| 2002/0138318 A1 | 9/2002 | Ellis et al. | |
| 2002/0194040 A1 | 12/2002 | Kornfein et al. | |
| 2002/0198750 A1 | 12/2002 | Innes et al. | |
| 2003/0023470 A1 | 1/2003 | Labbi | |
| 2003/0023526 A1 | 1/2003 | Stewart | |
| 2003/0046128 A1 | 3/2003 | Heinrich | |
| 2003/0126049 A1* | 7/2003 | Nagan et al. | 705/35 |
| 2003/0135401 A1 | 7/2003 | Parr | |
| 2003/0182337 A1 | 9/2003 | Wefers et al. | |
| 2004/0015375 A1 | 1/2004 | Cogliandro | |
| 2004/0068429 A1 | 4/2004 | MacDonald | |
| 2004/0068431 A1 | 4/2004 | Smith et al. | |

(Continued)

OTHER PUBLICATIONS

Crowe, T. J. et al. "Quantitative risk level estimation of business process reengineering efforts", Business Process Management Journal, vol. 8 No. 5, 2002, pp. 490-511.

(Continued)

*Primary Examiner* — Harish T Dass
(74) *Attorney, Agent, or Firm* — Finnegan, Henderson, Farabow, Garrett & Dunner, L.L.P.

(57) ABSTRACT

Methods, systems and computer products are provided for risk evaluation. A computer may assign a risk to an object which has an object estimation-value. The computer may also receive a risk estimation-value for the risk. The computer may re-calculate the object estimation-value based on the risk estimation-value.

12 Claims, 7 Drawing Sheets

U.S. PATENT DOCUMENTS

2005/0086090 A1 4/2005 Abrahams et al.
2008/0027841 A1 1/2008 Eder

OTHER PUBLICATIONS

AIRMIC "A Risk Management Standard", AIRMIC, ALARM, IRM, 2002; pp. 1-17.
Haimes, Y. "Risk Modeling, Assessment and Management", John Wiley & Sons, Inc., 1998, ISBN: 0471240052.
Meullbroek, L. "The Promise and Challenge of Integrated Risk Management", Risk Management and Insurance Review, vol. 5, No. 1, Spring 2002.
Palisade.com Web Pages—@Risk, May-Jun. 2000, Retrieved from Archive.org, Apr. 7, 2006.
"SAP AG Strengthens SAP Strategic Enterprise Management Solution by Adopting Proven Approach for Strategic Management Process"; From The Balanced Scorecard Collaborative, Business Wire, Apr. 20, 1999.
Wefers, M. "Strategy Company Management With Balanced Scorecard"; SAP AG, 1999, German.
Will, M. "Rating Reasonable Risks"; Women in Business, vol. 53, No. 4, Jul./Aug. 2001, pp. 18-19.
"Translating Strategy into Action: The Balanced Scorecard"; White Paper—SAP® Strategic Enterprise Management, SAP AG, Walldorf, Germany, pp. 1-45 May 1999.
"mySAP™ Financials: Strategic Enterprise Management With The Balanced Scorecard"; SAP Solution Brief, SAP AG, Walldorf, Germany, 4 pages 2002.
Dewor, E. et al. "Wie KonTraG einen Beitrag zur Unternehmenssteuerung leisten kann"; available for downloading from http://www.accenture.de/static_pdf/fa__fs__kontrag_versicherunqsw_0802.pdf, 13 pages Feb. 2002, with English language translation.
Dewor, E. et al. "Wie das KonTraG einen Beitrag zur Unternehmenssteuerung leisten kann"; Versicherungswirtschaft, Verlag Versicherungswirtschaft GmbH, Karlsruhe, Germany, pp. 242-245 Apr. 2002.
CorVu and IBS Provide Business Performance Management Solutions for SAP, Business Wire, Oct. 31, 2000.
CorVu Introduces Enterprise Risk Management for the $21^{st}$ Century, PR Newswire, Nov. 28, 2001.
Cummings, N., @Risk delivers richer picture, OR Topics, Feb. 1999.
Epstein, M. et al. "Implementing corporate Strategy: From Tableaux de Bord to Balanced Scorecards," European Management Journal, vol. 16, No. 2, 1998.
Ergometrics.com Web Pages, Mar. 2001, Retrieved from Archive.org, Jan. 25, 2007.
SAP Strategic Enterprise Management: Enabling Value Based Management, SAP AG, 1999.
Wefers, Marcus, Strategic Enterprise Management with SAP Balanced Scorecard, SAP Insider, vol. 2, No. 1, Jan.-Mar. 2001.

* cited by examiner

METHODS AND SYSTEMS FOR RISK EVALUATION

CROSS-REFERENCE TO RELATED APPLICATIONS

This is a division of application Ser. No. 10/307,971, filed Dec. 3, 2002, now U.S. Pat. No. 7,930,230, which claims the benefit of priority under 35 U.S.C. §119(e) to U.S. Provisional Application No. 60/382,024, filed May 22, 2002, and U.S. Provisional Application No. 60/355,833, filed Feb. 13, 2002, all three applications hereby incorporated herein by reference.

BACKGROUND OF THE INVENTION

I. Field of the Invention

The present invention generally relates to the field of electronic data processing. More particularly, the invention relates to methods, computer program products and systems for evaluating risks, such as risks involved in strategic planning and other types of analysis.

II. Background Information

Key-figures are used by enterprises to monitor performance of their strategic processes. For example, a key-figure "number of visits to prospects" might have a causal relationship to the "number of new customer acquisitions," which can be used as a measure for a business development process. In the end, the "number of new customer acquisitions" can have a direct impact on a "turnover" key-figure of the enterprise and be important to the financial results of the enterprise.

Strategic planning usually includes a projection of how the enterprise expects these key-figures to develop in the future. Often, a financial goal is set and the causal relationships of the various key-figures are used to plan and control the corresponding processes that have an impact on financial results.

Various uncertainties or risks can impact outcomes or performance of a enterprise. Therefore, there is a need to evaluate uncertainties that come along with strategic planning. There is also a need to evaluate risks related to other applications, such as the planning or analysis for social, economic or political applications.

BRIEF DESCRIPTION OF THE DRAWINGS

The accompanying drawings, which are incorporated herein and constitute a part of this specification, illustrate various features and aspects of embodiments of the invention. In the drawings.

DETAILED DESCRIPTION

Embodiments of the invention can be realized and attained by means of the elements and combinations disclosed herein. It is to be understood that the following detailed description is exemplary and explanatory only and is not restrictive of the embodiments of the invention. Wherever possible, the same reference numbers will be used throughout the drawings to refer to the same or like parts. For convenience of explanation, a list of references is provided prior to the claims.

In accordance with embodiments of the present invention, a risk evaluation system is provided that includes a memory for storing an assignment structure. The risk evaluation system may also include a processor that is programmed for assigning a risk to an object using the assignment structure. Consistent with embodiments of the invention, the object may be related to planning or analysis, such as strategic planning for an enterprise, as well as planning or analysis for social, economic or political determinations. Examples of an object in a strategic enterprise management context include a strategy, a strategy-element, a perspective, an objective, a target, a key-figure and a measure.

According to an embodiment of the invention, the object may have an object estimation-value. The object estimation-value, as used hereinafter, represents an estimate of a value that relates to one or more specific values of the object. Specific values of the object can be, for example, plan values, actual values, variances, target values or other calculated values. In addition, a risk, as used hereinafter, is a representation of a possible event that creates uncertainty for an object estimation-value.

Consistent with an embodiment of the invention, the risk evaluation system may include an interface that receives a risk estimation-value for the risk. The risk estimation-value, as used hereinafter, relates to an estimate for the impact of the risk on the object estimation-value of the object. Examples of a risk estimation value include the impact of new competitors on turnover, the impact of demographic factors on insurance payments, the impact of political crisis on oil price or any other factor whose impact on the object estimation-value is uncertain. The processor of the risk evaluation system may execute program instructions for re-calculating the object estimation-value by using the risk estimation-value.

In accordance with other embodiments of the invention, a method is provided for risk evaluation. The method includes assigning a risk to an object, wherein the object has an object estimation-value. Embodiments of the method may further include receiving a risk estimation-value for the risk and re-calculating the object estimation-value by using the risk estimation-value.

Consistent with additional embodiments of the invention a method is provided for risk evaluation. Such a method may include providing an estimation-value for an object and assigning a risk to the object to correct the estimation-value.

In accordance with still additional embodiments of the invention, another method is provided for risk evaluation. As disclosed herein, the method may include assigning a risk to an object, wherein the object is a component of a score-card and has an object estimation-value. A score-card may include a plurality of objects, wherein the objects have relationships that indicate interdependencies between objects. Examples of score-cards are "Balanced Score-Cards" such as those used in Strategic Enterprise Management to monitor the performance of enterprises. Other examples of score-cards include score-cards to monitor the performance of funds, score-cards to monitor reliability of various car brands, and any other score-card that can be used to monitor values related to a specific field. Methods of the present invention may further include the steps of receiving a risk estimation-value for the risk and re-calculating the object estimation-value by using the risk estimation-value.

Additional features and embodiments of the invention will be set forth in the description which follows, and in part will be apparent from the description or may be learned by practice of embodiments of the invention.

Figure 1:
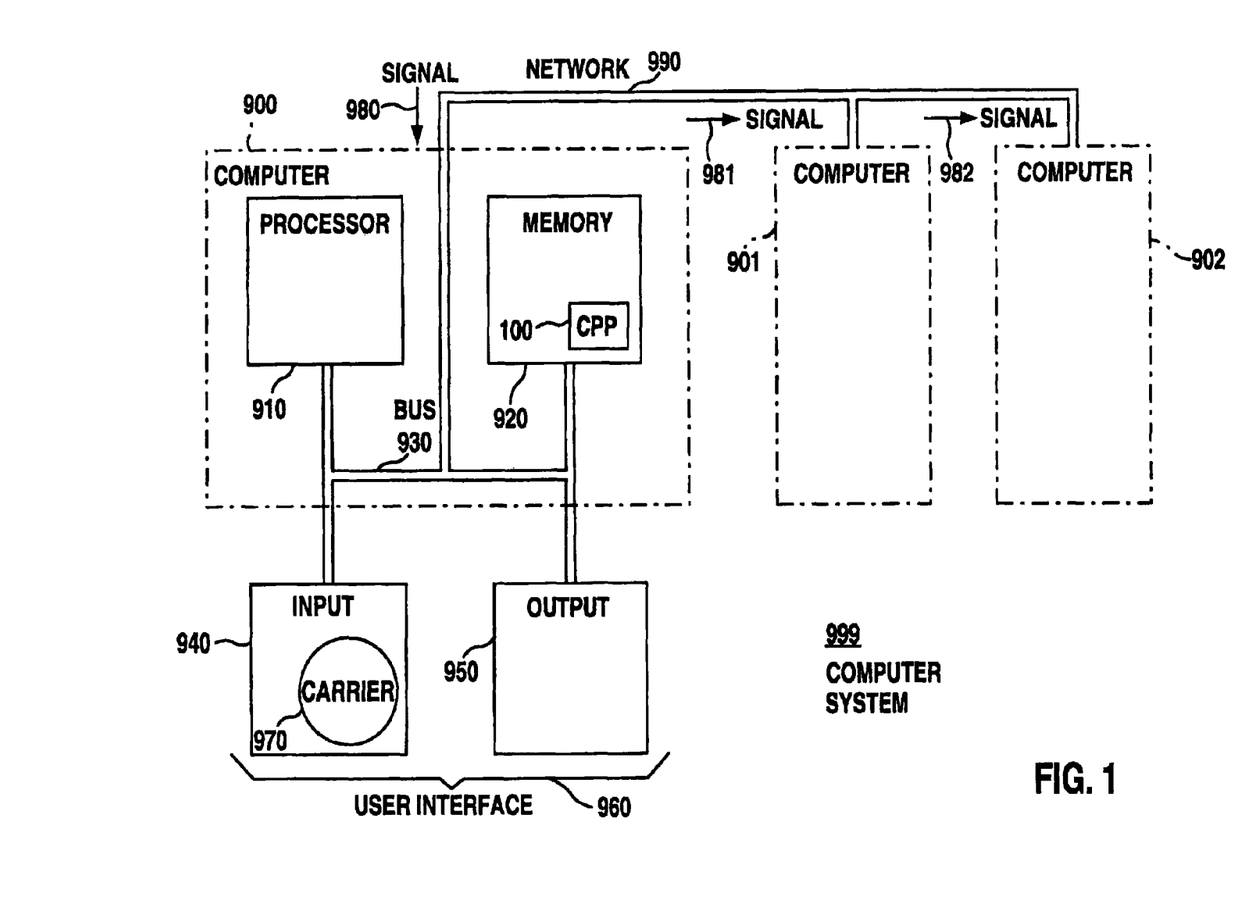
FIG. 1 illustrates a simplified block diagram of an exemplary computer system which may be used to implement embodiments of the present invention.

FIG. 1 illustrates an exemplary computer system 999, which may be used to implement embodiments of the present invention. Computer system 999 includes a computer 900 and optionally can have a plurality of further computers 901, 902 (or 90$q$, with q=0 . . . Q−1, Q any number).

In the case of multiple computers, computer 900 may be connected to further computers 901, 902 via a computer network 990. As illustrated in FIG. 1, computer 900 may comprise a processor 910, a memory 920, a bus 930, and, optionally, an input device 940 and an output device 950 (I/O devices, user interface 960). Consistent with embodiments of the invention, features of the invention may be implemented using a computer program product 100 (CPP), a program carrier 970 and/or a program signal 980, collectively "program".

With respect to computer 900, computer 901/902 may sometimes be referred to as a "remote computer." Computer 901/902 is, for example, a server, a router, a peer device or other common network node, and typically comprises many or all of the elements described relative to computer 900. Hence, elements 100 and 910-980 in computer 900 also collectively illustrate corresponding elements 10$q$ and 91$q$-98$q$ (shown for q=0) in computers 90$q$.

Computer 900 is, for example, a conventional personal computer (PC), a desktop device, a hand-held device, a multiprocessor computer, a pen computer, a microprocessor-based or programmable consumer device, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), a digital signal processor (DSP), or the like.

Memory 920 symbolizes elements that temporarily or permanently store data and instructions. Although memory 920 is conveniently illustrated as part of computer 900, memory function can also be implemented in network 990, in computers 901/902 and in processor 910 itself (e.g., using a cache or register) or elsewhere. Memory 920 can be a read only memory (ROM), a random access memory (RAM), or a memory with other access options. Memory 920 may be physically implemented by computer-readable media, such as, for example: (a) magnetic media, such as a hard disk, a floppy disk or other magnetic disk, a tape, or a cassette tape; (b) optical media, such as an optical disk (e.g., a CD-ROM, a digital versatile disk (DVD)); (c) semiconductor media, such as DRAM, SRAM, EPROM, EEPROM, memory stick, or by any other media, such as paper.

Optionally, memory 920 is distributed across different media. Also, portions of memory 920 can be removable or non-removable. For reading from media and for writing to media, computer 900 may use devices well known in the art such as, for example, disk drives, tape drives, etc.

Memory 920 stores support modules such as, for example, a basic input output system (BIOS), an operating system (OS), a program library, a compiler, an interpreter, and/or a text-processing tool. Support modules are commercially available and can be installed on computer 900 by those of skill in the art. For simplicity, these modules are not illustrated.

CPP 100 may comprise program instructions and—optionally—data that cause processor 910 to execute method steps of embodiments of the present invention. Exemplary method steps are explained with more detail below. In other words, CPP 100 may define the operation of computer 900 and its interaction in network system 999. For example and without the intention to be limiting, CPP 100 can be available as source code in any programming language, and as object code ("binary code") in a compiled form. Persons of skill in the art can use CPP 100 in connection with any of the above-noted support modules (e.g., a compiler, an interpreter and/or an operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as the types of medium explained above (cf. memory 920). Generally, carrier 970 is an article of manufacture comprising a computer readable medium having computer readable program code means embodied therein for executing the method of the present invention. Further, program signal 980 can also embody computer program 100. Signal 980 travels on network 990 to computer 900.

CPP 100, program carrier 970, and program signal 980 have been conveniently described in connection with computer 900. Optionally, program carrier 971/972 (not shown) or program signal 981/982 can embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., a mouse, a trackball, a cursor direction keys), a microphone, a joystick, a game pad, a scanner and/or a disk drive. Although the examples are devices with human interaction, device 940 can also operate without human interaction, such as a wireless receiver (e.g., with satellite dish or terrestrial antenna), a sensor (e.g., a thermometer) and/or a counter (e.g., goods counter in a factory). Input device 940 can serve to read carrier 970.

Output device 950 symbolizes a device that presents instructions and data that have been processed. For example, a monitor or a display (such as a cathode ray tube (CRT)), a flat panel display, a liquid crystal display (LCD), a speaker, a printer, a plotter and/or a vibration alert device. Similar as above, output device 950 communicates with the user, but it can also communicate with further computers.

Input device 940 and output device 950 can be combined into a single device. Alternatively, either device 940 or 950 can be provided optionally.

Bus 930 and network 990 provide logical and physical connections by conveying instruction and data signals. While connections inside computer 900 are conveniently referred to as "bus 930," connections between computers 900-902 are referred to as "network 990." Optionally, network 990 comprises gateways being computers that specialize in data transmission and protocol conversion.

Devices 940 and 950 are coupled to computer 900 by bus 930 (as illustrated in FIG. 1) or by network 990 (optional).

While the signals inside computer 900 are mostly electrical signals, the signals in network may be electrical, magnetic, optical and/or wireless (radio) signals.

Networking environments (as network 990) are commonplace in offices, enterprise-wide computer networks, intranets and the Internet (i.e., World Wide Web). The physical distance between a remote computer and computer 900 is not important. Network 990 may be implemented through any combination of wired and/or wireless network(s). To name a few network implementations, network 990 may be, for example, a local area network (LAN), a wide area network (WAN), a public switched telephone network (PSTN), an Integrated Services Digital Network (ISDN), an infra-red (IR) link, a radio link, such as Universal Mobile Telecommunications System (UMTS), a Global System for Mobile Communication (GSM), a Code Division Multiple Access (CDMA) network, and/or a satellite link.

Various transmission protocols and data formats may be used such as, for example, transmission control protocol/internet protocol (TCP/IP), hyper text transfer protocol (HTTP), secure HTTP, wireless application protocol, unique resource locator (URL), a unique resource identifier (URI), hyper text markup language (HTML), extensible markup language (XML), extensible hyper text markup language (XHTML), wireless application markup language (WML), Standard Generalized Markup Language (SGML), etc.

Interfaces coupled between the elements are also well known in the art. For simplicity, such interfaces are not illustrated. An interface can be, for example, a serial port interface, a parallel port interface, a game port, a universal serial bus (USB) interface, an internal or external modem, a video adapter, and/or a sound card.

Computer(s) and program(s) are closely related. As used hereinafter, phrases, such as "the computer provides" and "the program provides," are convenient abbreviations to express actions by a computer that is controlled by a program.

Figure 2A:
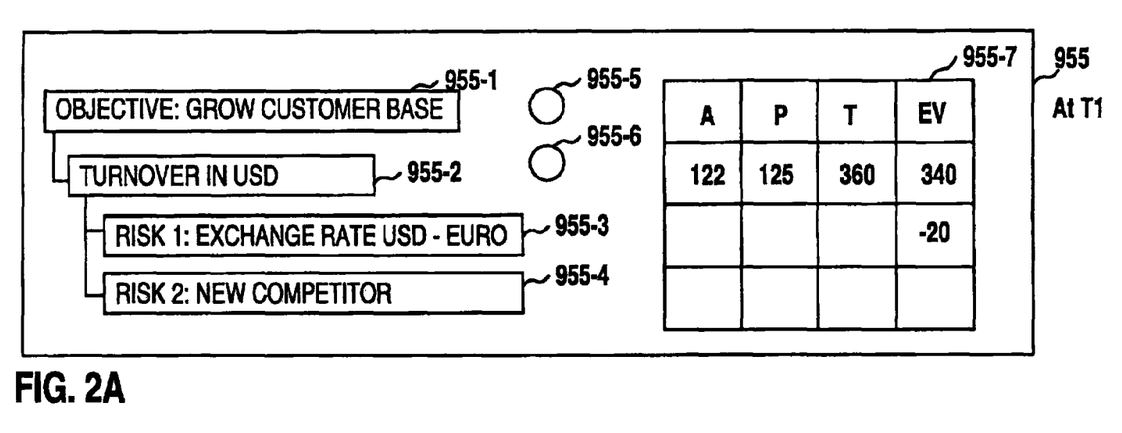
FIGS. 2A and 2B illustrate examples of a graphical user interface that can be generated by a computer, consistent with embodiments of the present invention.
Figure 2B:
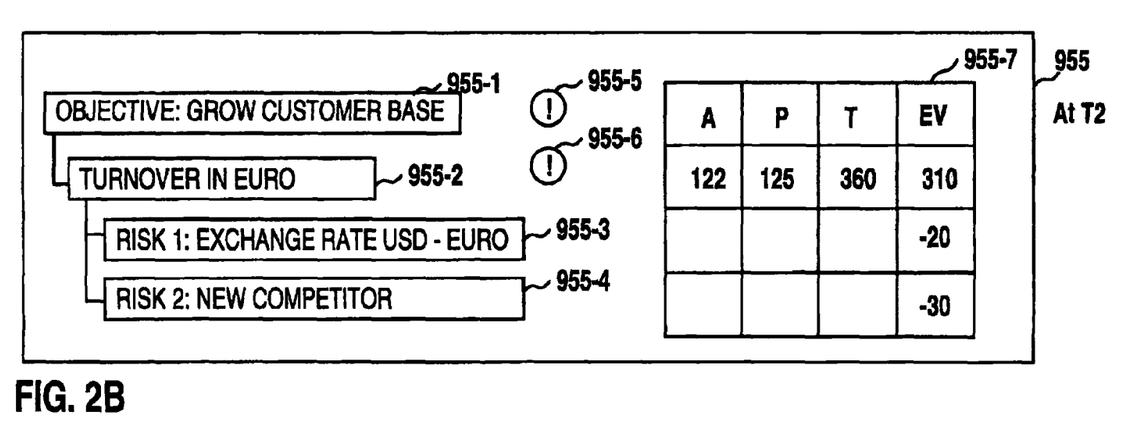

FIGS. 2A and 2B illustrate examples of a graphical user interface (GUI) 955 that may be generated by a computer 900 (cf. FIG. 1), which is operated according to embodiments of the present invention. For example, GUI 955 is visualized for a user via output device 950 (cf. FIG. 1) at two different time points T1 (cf. FIG. 2A) and T2 (cf. FIG. 2B). T2 is after T1.

The following scenario will be referred to as an example of an embodiment of the present invention. However, this scenario is not meant to limit the scope of the claimed embodiments of the invention.

At T1, GUI 955 includes layout-components 955-1 to 955-7. GUI 955 may be part of an application to plan and track objectives of an enterprise. In the example, GUI 955 shows a portion of a score-card. In this embodiment, layout-component 955-1 (objective) shows one objective of the enterprise: "OBJECTIVE: GROW CUSTOMER BASE." The enterprise can use multiple key-figures to plan and track this objective. One key-figure that is assigned to the objective is shown in layout-component 955-2 (turnover): "TURNOVER IN USD." An increase in turnover can be an indicator for customer base growth. Layout-components 955-3 (risk 1) and 955-4 (risk 2) show two risks that are assigned to turnover 955-2 because they may have impact on the enterprises turnover: "RISK1: EXCHANGE RATE USD-EURO" and "RISK 2: NEW COMPETITOR." Fluctuations in currency exchange rates can heavily impact the turnover in the enterprise's home currency. New competitors entering the market can gain market share from the enterprise and also account for reduced turnover.

Consistent with embodiments of the invention, layout-component 955-7 (table) may be a table that includes cells to present values to and receive values from the user.

In the example of FIGS. 2A and 2B, the first row of table 955-7 refers to the turnover in USD. Column A includes actual values. The actual value of the turnover in USD is "122" (e.g., for a given period, such as the first two quarters of the business year). Column P includes the corresponding plan value, which is for example "125." Column T includes a target value for the turnover (e.g., for the full business year). The column EV shows the (latest) estimation-value "340" for the corresponding target value "360."

In the second row of table 955-7, column EV includes an estimation-value "−20" for risk 1. This indicates to the user that the impact of the currency exchange rate risk is currently assumed to reduce the target value "360" of the turnover by "20."

At T2, the situation has changed for the enterprise. For example, a new competitor unexpectedly entered the market. The new competitor uses aggressive pricing to gain market share. The sales manager of the enterprise expects to lose customer orders to the new competitor. Therefore, the sales manager can enter an estimation-value "−30" in column EV to value risk 2. The computer re-calculates the estimation-value of the turnover by reducing the amount to "310" according to the new risk 2 estimation-value.

In the example of FIG. 2B, layout-component 955-6 (risk status) indicates (!) to the user that the sum of all risks assigned to the turnover exceeded a given threshold value (e.g., 10%). Any other visual or audio representation of the risk status can be used (e.g., bullets with different colors, icons, sound signals, etc.). At T1, the risk status 955-6 is still empty. Preferably, the risk status of each measure is consolidated and results in a risk status (layout component 955-5) for target 955-1 itself. Therefore, at T2, risk status 955-5 is changed (e.g., from empty to "!").

Preferably, the estimation-values of risks 955-3, 955-4 have the same unit of measure (e.g., USD) as the turnover key-FIG. 955-2.

Consistent with embodiments of the invention, the GUIs of FIGS. 2A and 2B are exemplary and any type of GUI can be used. For example, the GUI can include further layout-components to represent score-cards, one or more strategies, strategy-elements, perspectives, targets, objectives, risks, key-figures, measures and/or any other layout-component that can be relevant for strategic enterprise management. The layout-components can have relationships defined by assignments, such as: perspective-to-score-card assignments, objective-to-perspective assignments, key-figure-to-objective assignments, measure-to objective assignments, measure-to-target assignments and risk-to-key-figure assignments. Any other assignment that supports strategic enterprise management may be defined. Values in table 955-7 can use other layout-components, such as input fields, output fields, rows, columns, etc. with appropriate navigation tools, such as scroll bars, data set selectors and drop-down menus.

The explanatory scenario refers to a business environment where one embodiment of the present invention is used to monitor the performance of an enterprise and facilitate decision making. Other scenarios relating to other environments, such as decision support in politics, conflict situations, buying/purchasing, medical treatment, etc., may be implemented by using alternative embodiments of the present invention.

Figure 3:
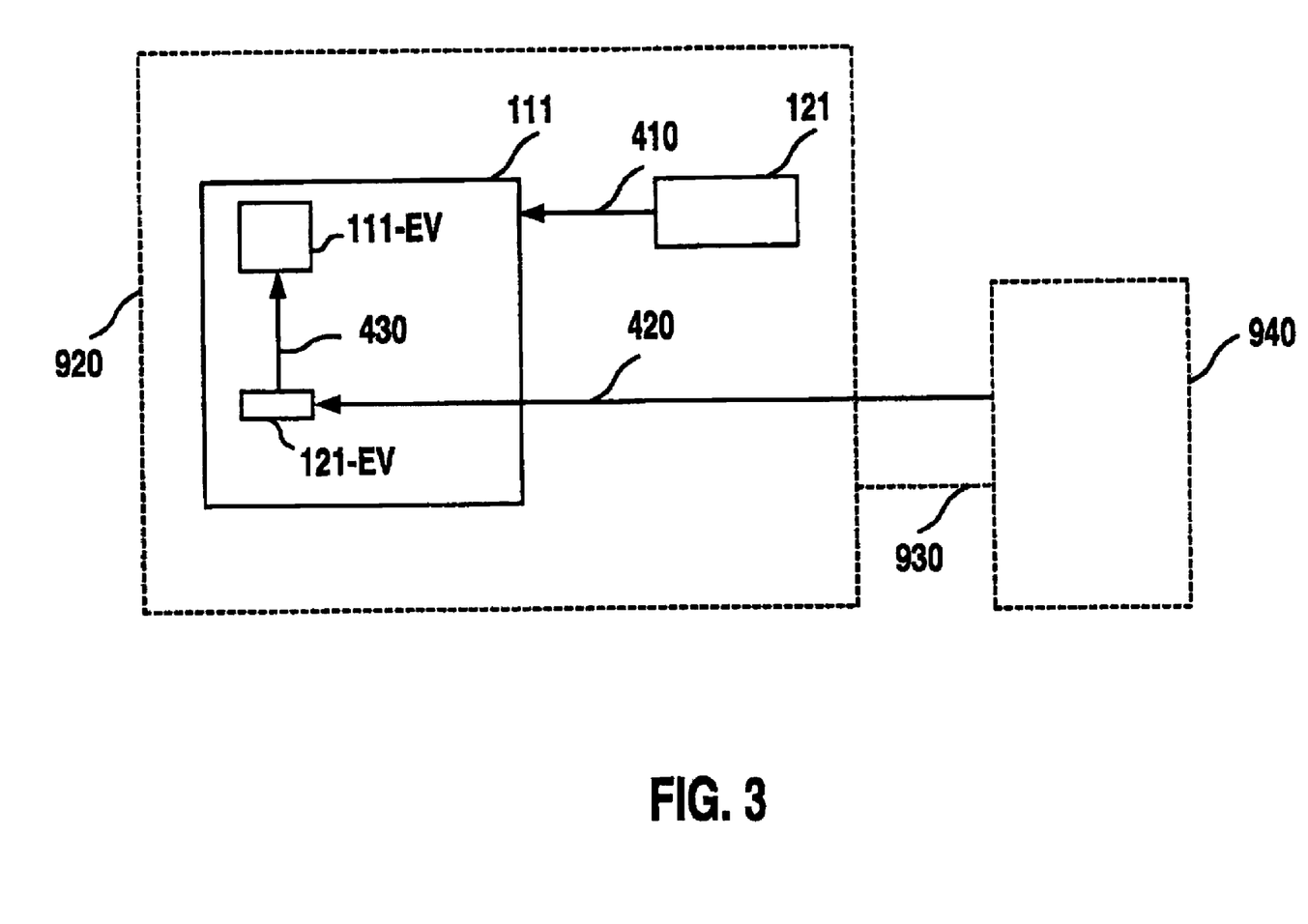
FIG. 3 illustrates details of an implementation of an exemplary risk evaluation system, consistent with embodiments of the present invention.

FIG. 3 illustrates details of an implementation of a risk evaluation system, consistent with embodiments of the present invention. Hardware components of computer 900

(cf. FIGS. 2A and 2B) are illustrated by dashed lines/frames. Software components are illustrated by solid lines/frames.

As explained earlier in FIG. 1, input device 940 can be connected to memory 920 via bus 930. Memory 920 may store at least one predefined risk 121 and at least one predefined object 111. Alternatively, risks and objects can be stored on different storage devices of computer system 999 (cf. FIG. 1). Other possibilities of storage arrangements can be used, such as those known to individuals skilled in the art, and thus are within the scope of the invention. In one example, object 111 is a key-figure and has object estimation-value 111-EV. In the example of FIGS. 2A and 2B, estimation-value 111-EV of object 111 corresponds to the value "340" in column EV of table 955-7 for turnover 955-2. Object 111 can also be a strategy, a strategy-element, a perspective, an objective, a target, a measure and/or any other object that is used in strategic enterprise management. In other words, embodiments of the present invention are not dependent on the meaning of any of the layout-components in FIGS. 2A and 2B.

When assigning 410 risk 121 to object 111, memory 920 may provide a storage location for risk estimation-value 121-EV as part of object 111. Risk estimation-value 121-EV relates to risk 121.

Referring back to the example of FIGS. 2A and 2B, the estimation-value of risk 2 (955-4) corresponds to risk estimation-value 121-EV. Various arrangements may be provided for receiving 420 an estimative-value for the risk. For example, a sales manager may enter a value (e.g., "−30") for risk estimation-value 121-EV via input device 940 (e.g., a keyboard). Other arrangements are also possible for receiving a risk estimation-value. In one embodiment of the present invention, memory 920 receives the value via bus 930. In another embodiment, the value can be received from any computer or input device in computer system 999 (cf. FIG. 1). This includes also any computer that might be linked to computer 900 via the Internet or any other network like WAN or LAN networks.

Computer 900 may re-calculate 430 object estimation-value 111-EV by taking into account risk estimation-value 121-EV. Different approaches or algorithms may be utilized to re-calculate the object estimation-value depending on the application. In one implementation, risk estimation-value 121-EV is added to object estimation-value 111-EV. In other implementations, other algorithms can be used, such as averaging, weighted averaging and/or factoring the estimation-values.

By making the impact of risks on key-figures apparent, embodiments of the invention allow the impact of risks on strategic key-figures of an enterprise to be considered in the strategic planning process of the enterprise.

Figure 4:
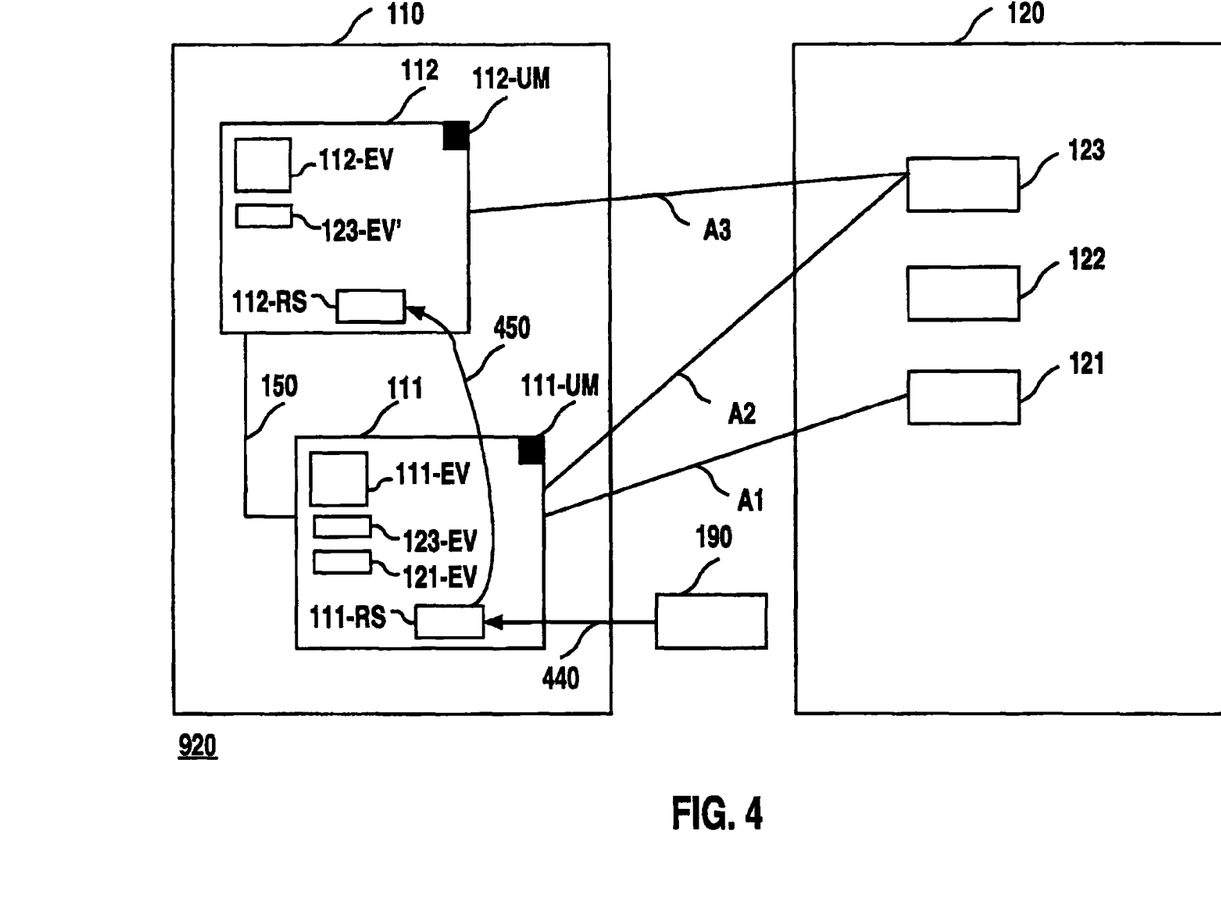
FIG. 4 illustrates an exemplary memory of a risk evaluation system, consistent with embodiments of the present invention.

FIG. 4 illustrates an exemplary memory of a risk evaluation system, consistent with embodiments of the invention.

In one embodiment of the present invention, object 111 is a component of score-card 110. Score-card 110 can have further objects, such as key-figures, measures, objectives, perspectives, targets or any other object relevant to strategic enterprise management. In one example, further object 112 is an objective. Objects in score-card 110 can have hierarchical relationships with each other. In the example, object 111 (key-figure) is a child of further object 112 (objective). This is indicated by parent-child relation 150. Other combinations for relationships are possible, such as perspective-to-score-card relationships, objective-to-perspective relationships, key-figure-to-objective relationships, measure-to-objective relationships, risk-to-measure relationships and/or risk-to-key-figure relationships. Any other relationship that supports strategic enterprise management may be defined.

As known by those skilled in the art, hierarchical relationships can be stored in a hierarchy data structure. One embodiment of the hierarchy data structure can be a database table having parent-child data sets. Another embodiment can be a markup language file, such as an XML or XHTML file, where a tag hierarchy reflects the hierarchical relationships. For example, a tag representing further object 112 (parent) has a further tag representing object 111 (child).

Each object 111, 112 has its estimation-value 111-EV, 112-EV, respectively. Further, each object 111, 112 has a unit of measure 111-UM, 112-UM, respectively. Preferably, the unit of measure (e.g., "Mil USD" for millions of United States dollars) is used for any value (e.g., actual turnover, planned turnover, target value, estimation-value, etc) that is assigned to the corresponding object. In other words, estimation-values for a risk use the unit of measure of the object where the risk is assigned to. If needed, conversion algorithms may be used to convert the estimation-value for a risk (stored in one unit of measure format) into the unit of measure of a corresponding object. In the example, risks 121, 123 are assigned A1, A2 to object 111. The corresponding risk estimation-values 121-EV, 123-EV use unit of measure 111-UM of object 111. Risk 123 is also assigned A3 to further object 112. Therefore, corresponding risk estimation-value 123-EV' uses unit of measure 112-UM of further object 112, which can be different from unit of measure 111-UM. By measuring risks in the same units of measure as the objects where they are assigned to, the impact of a risk on the object becomes apparent. Referring back to the example of FIGS. 2A and 2B, a sales manager may be more likely in a position to estimate in USD how risk 2 (new competitor) will affect the turnover than to estimate an abstract probability value in percentages, wherein the probability value is primarily not related to the corresponding key-figure (turnover).

Preferably, risk 121 is a component of risk-catalogue 120. Risk-catalogue 120 can store further risks 122, 123, etc. Each risk in risk-catalogue can be assigned to each object in score care 110 and each object can have one or more risk assigned to it.

Optionally, each object 111, 112 has a risk status 111-RS, 112-RS, respectively. The risk status of an object provides an aggregate view on the total impact of all risks assigned to the object. For example, risk status 111-RS of object 111 takes into account risk estimation-values 121-EV, 123-EV. In the example of FIGS. 2A and 2B, a visualization (e.g., !) of risk status 111-RS is presented to the user via layout-component 955-6. For example, in one implementation of an embodiment of the present invention, risk status 111-RS is calculated 440 by comparing the total impact of risks assigned to object 111 with a predefined threshold value. In another implementation, risk status 111-RS is calculated 440 by using predefined rules. The predefined threshold values or rules are stored in rule-set 190. For example, rules in rule-set 190 can be dynamic by varying the threshold value depending on a certain base value, such as plan value, actual value or target value (cf. FIGS. 2A and 2B) or any other value that is relevant for the object and might be calculated by using the aforementioned values. Rule-set 190 can also include rules that describe the impact of risk-status 111-RS on further risk-status 112-RS of further object 112. Computer 900 calculates 450 further risk-status 112-RS by taking into account risk status 111-R. Preferably, when calculating 450 further risk-status 112-RS, the total impact of risks (e.g., 123-EV') assigned to further object 112 is also considered.

The risk status of an object provides an aggregate view on the impact of all risks assigned to the object. By using relationships between various objects, the risk status of one object can impact the risk status of a further object, when the further object is a parent of the object. This provides a consistent overview of the impact of all risks on all objects within score-card 110.

Figure 5:
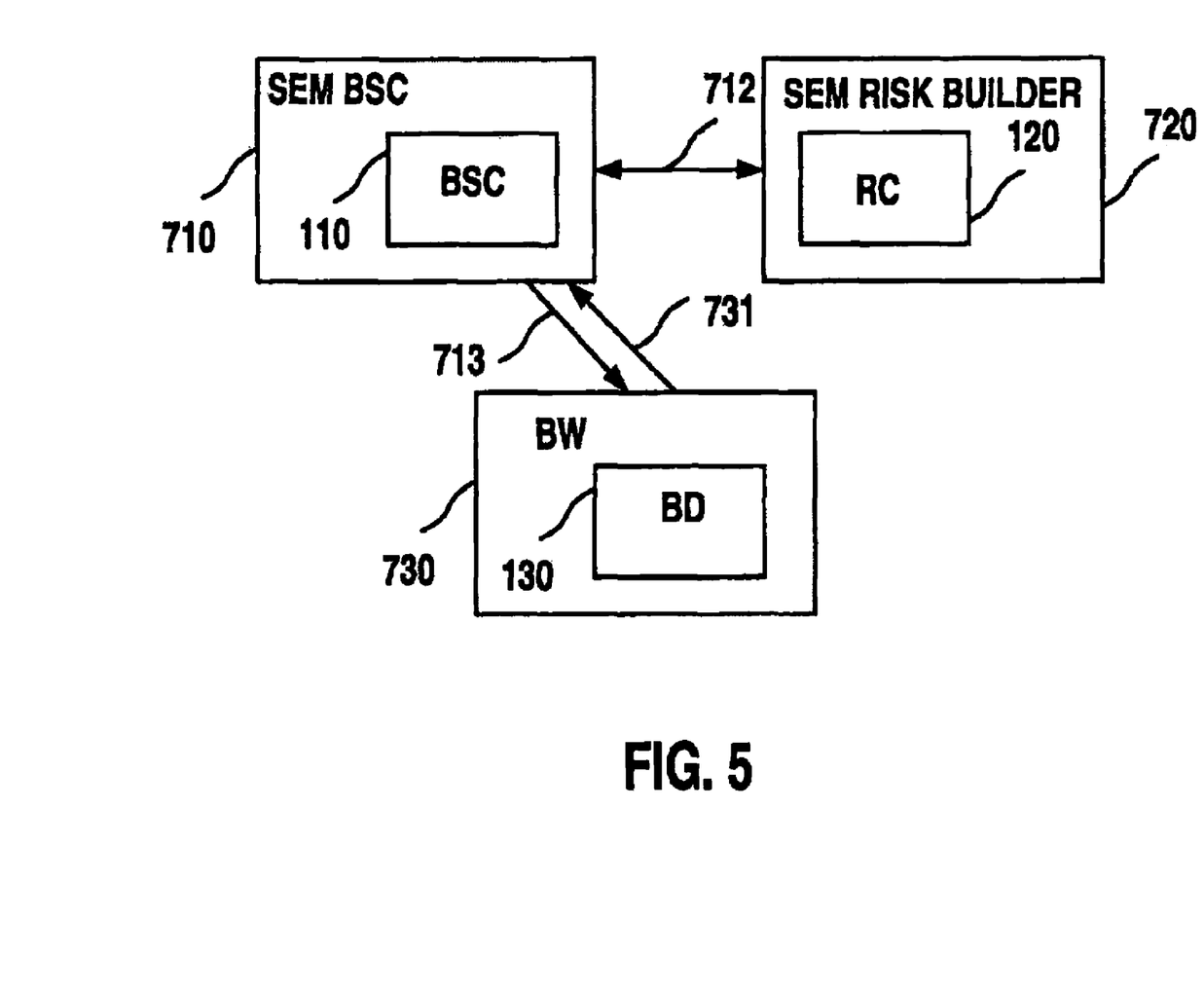
FIG. 5 illustrates an alternative embodiment of the present invention.

FIG. 5 illustrates an alternative embodiment of the present invention. As illustrated in FIG. 5, a score-card 110, such as a balanced score-card (BSC), may be provided by a strategic enterprise management component 710, such as the SEM BSC solution of SAP AG (Walldorf, Germany), and a risk catalogue 120 (RC) may be provided by a risk management component 720, such as the SEM Risk Builder of SAP AG. For example, values of BSC objects can be derived 731 from business data (BD) 130 stored in a data warehouse 730, such as the Business Information Warehouse (BW) of SAP AG. The values of the BSC objects can be stored 713 in the data warehouse 730. By combining 712 a strategic enterprise management component 710 with a risk management component 720, the user is provided with a solution to better evaluate uncertainties related to risks that have impact on plan values for any object, such as strategy elements, perspectives, objectives, targets, key-figures, measures, etc.

Figure 6:
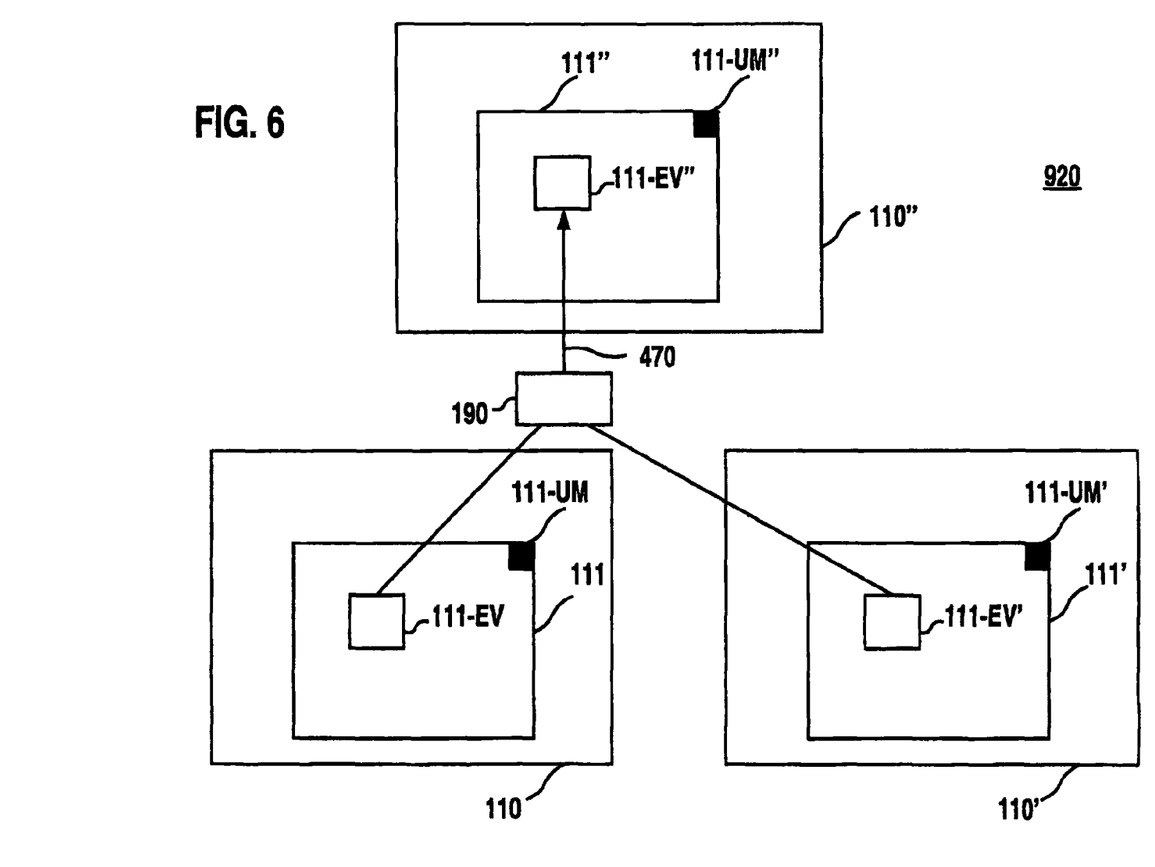
FIG. 6 illustrates an exemplary aggregation of objects in different score-cards, consistent with embodiments of the present invention.

FIG. 6 illustrates an exemplary aggregation of objects 111, 111' into a similar object 111," wherein the objects 111, 111' and the similar object 111" can belong to different score-cards 110, 110', 110," respectively.

In one implementation, computer 900 (cf. FIG. 1) provides multiple score-cards 110, 110', 110" in memory 920. In another implementation, the score-cards 110, 110', 110" can be distributed over multiple storage devices of computer system 999. For example, the functionality of score-cards 110', 110" is substantially equivalent to the functionality of score-card 110. In another implementation, the different score-cards can be stored in different storage locations of computer system 999 (cf. FIG. 1).

For example, each score-card 110, 110', 110" stores at least one object 111, 111', 111," respectively. Objects 111, 111', 111" are similar. "Similar," as used hereinafter, means that the objects are of the same type (e.g., strategy, strategy-element, perspective, objective, target, measure, key-figure) and refer to the same instance of this type (e.g., key-figure turnover). Preferably, units of measure 111-UM, 111-UM', 111-UM" of the objects are equal. Each object 111, 111', 111" has a corresponding object estimation-value 111-EV, 111-EV', 111-EV."

In one embodiment of the present invention, computer 900 aggregates 470 estimation-values of objects 111, 111' (e.g., object estimation-value 111-EV and indexed object estimation-value 111-EV') into corresponding object estimation-values of similar object 111" (e.g., corresponding object estimation-value 111-EV") by using rule-set 190. That is, estimation-values of objects 111, 111' are processed according to rules defined in rule-set 190 and the result is written to the corresponding object estimation-value of object 111." For example, corresponding object estimation-value 111-EV" in score-card 110" is the result of adding object estimation-value 111-EV and indexed first 111-EV' of score-cards 110, 110.' Another rule of rule-set 190 may calculate corresponding object estimation-value 111-EV'" as the average or weighted average of object estimation-value 111-EV and indexed object estimation-value 111-EV'. As appreciated by those skilled in the art, further rules of rule-set 190 can be defined as they are required by an enterprise for strategic enterprise management. Further, multiple estimation-values can be aggregated in aggregation step 470 substantially simultaneously.

By aggregating objects of different score-cards into an object of another score-card, one embodiment of the present invention allows a manager to get a consolidated view of the strategic plan of an enterprise from a single score-card (e.g., score-card 111").

Risk evaluation methods may be executed by a computer, such as computer 900 (cf. FIG. 1) running CPP 100. In one embodiment of the present invention, CPP 100 has a plurality of instructions that cause processor 910 (cf. FIG. 1) of computer 900 to execute the steps of a method (such as a risk evaluation method 400—cf. FIG. 7). CPP 100 can be stored on data carrier 970 (cf. FIG. 1) or carried by signal 980 (cf. FIG. 1).

Figure 7:
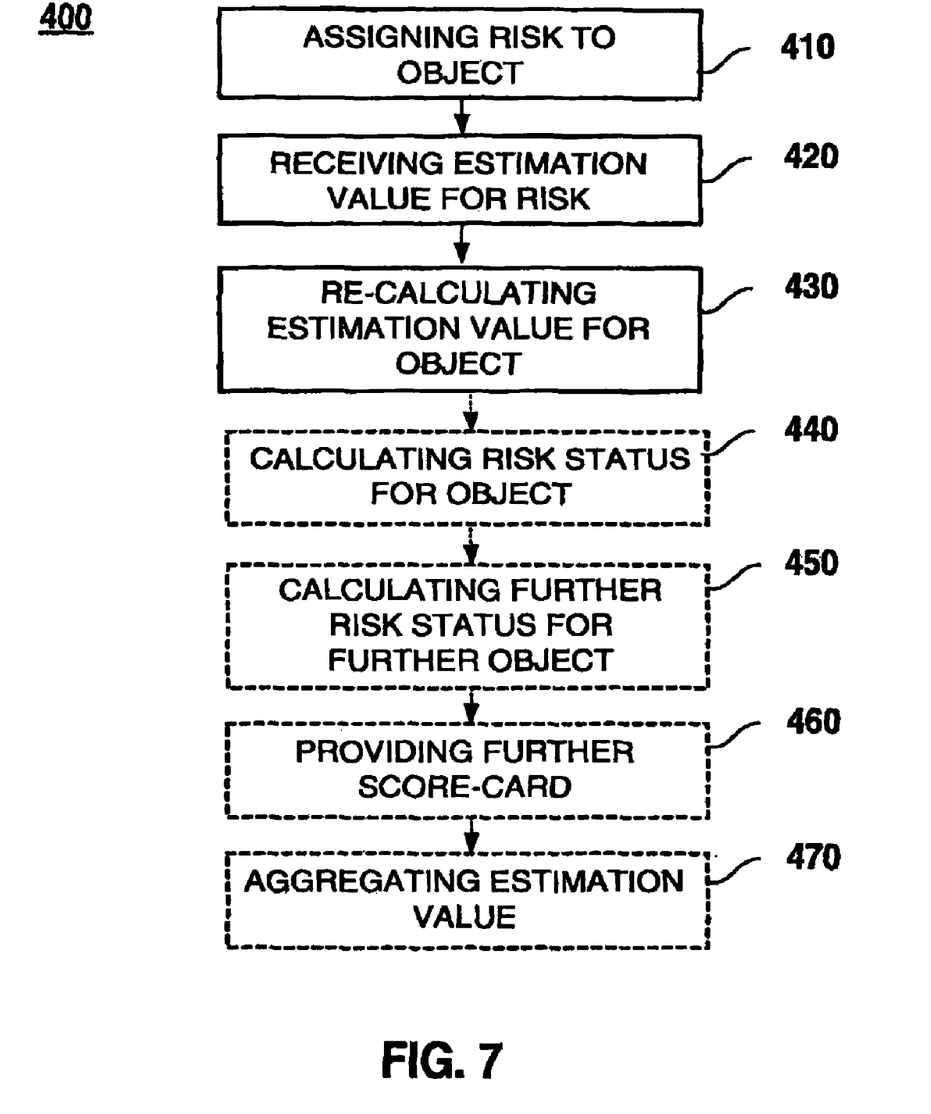
FIG. 7 illustrates a flowchart of an exemplary risk evaluation method, consistent with embodiments of the present invention.

FIG. 7 illustrates steps of an exemplary risk evaluation method 400, consistent with embodiments of the present invention. Method 400 includes the steps of assigning 410, receiving 420 and re-calculating 430. Optionally, method 400 may further include the steps of calculating 440, calculating 450, providing 460 and/or aggregating 470. Examples of these steps are now explained in detail.

In the assigning step 410, risk 121 (cf. FIG. 3) is assigned to object 111 (cf. FIG. 3). Assignments can be defined by those skilled in the art using, for example, assignment structures, such as an assignment database table or hierarchical data structures as used in markup language documents (e.g., XML-files, XHTML-files, etc.). In one implementation, risk 121 and object 111 are predefined. In another implementation, risk 121 and object 111 may be created in the assigning step. Object 111 can be a strategy, a strategy-element, a measure, an objective, a target, a key-figure and/or any other object that is meaningful in strategic enterprise management.

Object 111 has object estimation-value 111-EV (cf. FIG. 3). In a preferred implementation, object 111 is a component of score-card 110 (cf. FIG. 4) and risk 121 is a component of risk-catalogue 120 (cf. FIG. 4).

In the receiving 420 step, risk estimation-value (cf. FIG. 4) 121-EV for risk 121 is received. For example, a user can enter risk estimation-value 121-EV via an input-device, such as input-device 940 (cf. FIG. 3). In another embodiment of the present invention, risk estimation-value 121-EV can be received from a computer (e.g. computer 901, 902 cf. FIG. 1). Preferably, object 111 has a unit of measure 111-UM (cf. FIG. 4) and risk estimation-value 121-EV is received using the unit of measure 111-UM of object 111.

In the re-calculating 430 step, object estimation-value 111-EV is re-calculated by using risk estimation-value 121-EV. For example, a mathematical operation is applied to the object estimation-value and the risk estimation-value. Examples of mathematical operations include: adding, subtracting, dividing, multiplying, averaging, weighted averaging, linear regression and/or other mathematical operations that may be meaningful or useful for calculating the estimation value.

In accordance with an embodiment of the invention, optional steps 440, 450 may be provided. In optional steps 440, 450, score-card 110 provides at least one further object 112 that has a hierarchical relationship 150 (cf. FIG. 4) to object 111 so that object 111 is a child of further object 112. Further object 112 can be a strategy, a strategy-element, a perspective, an objective, a target, a measure, a key-figure and/or any other object that is meaningful in strategic enterprise management.

In the calculating 440 step, risk-status 111-RS is calculated for object 111 by using rule-set 190. For example, in one implementation of an embodiment of the present invention, risk status 111-RS is calculated 440 by comparing the total impact of risks assigned to object 111 with a predefined threshold value. In another implementation, risk status 111-RS is calculated 440 by using predefined rules. The predefined threshold values or rules are stored in rule-set 190. For example, rules in rule-set 190 can be dynamic by varying the threshold value depending on a certain base value, such as a plan value, an actual value or a target value (cf. FIGS. 2A and 2B) or any other value that is relevant for the object and might be calculated by using the aforementioned values.

In the calculating 450 step, further risk-status 112-RS for further object 112 is calculated by using risk-status 111-RS of object 111. Rule-set 190 can also include rules that describe the impact of risk-status 111-RS on further risk-status 112-RS of further object 112. For example, a risk-status can have various levels, such as high risk, medium risk and low risk, for indicating the importance of the risk. One rule to describe the impact of risk-status 111-RS on further risk-status 112-RS could be: the value of further risk-status 112-RS is replaced by the value of risk-status 111-RS if risk-status 111-RS indicates a higher risk. As will be appreciated by those skilled in the art, further rules can be defined for risk-status propagation between objects having a relationship by taking into account an enterprises risk management strategy.

In accordance with another embodiment of the invention, optional steps 460, 470 may be also be provided. In optional steps 460, 470, estimation-values originating from different score-cards are aggregated into a single score-card.

In the providing step 460, computer 900 provides at least further score-card 110,' wherein further score-card 110' is substantially equivalent to score-card 110. Score-card 110' has similar object 111', which is similar to object 111.

In the aggregating step 470, object estimation-value 111-EV may be aggregated into corresponding object estimation-value 111-EV' of similar object 111' according to rules of rule-set 190.

The invention is not limited to the particulars of the embodiments disclosed herein. For example, the individual features of each of the disclosed embodiments may be combined or added to the features of other embodiments. In addition, the steps of the disclosed methods herein may be combined or modified without departing from the spirit of the invention claimed herein.

Accordingly, it is intended that the specification and embodiments disclosed herein be considered as exemplary only, with a true scope and spirit of the invention being indicated by the following claims.

The following is a list of reference numerals used in the accompanying drawings. This list intended to facilitate the reader and should not be considered to limit the scope of the embodiments of the invention or the appended claims.

| Reference | Description |
| --- | --- |
| 100 | Computer Program Product |
| 110, 110', 110" | Score-Cards |
| 120 | Risk-Catalogue |
| 111, 111', 111", 112 | Objects |
| 121, 122, 123 | Risks |
| xxx-UM | Unit of Measure of an Object |
| xxx-EV | Estimation Value of an Object |
| xxx-RS | Risk Status of an Object |
| 190 | Rule-Set |
| Ax | Assignment Risk-Object |
| 150 | Assignment Object-Object |
| 400, 500 | Method |
| 4xx, 5xx | Method Steps |
| 955 | Graphical User Interface |
| 955-x | Layout Components |
| 999 | Computer System |
| 900, 901, 902 | Computers |
| 910, 911, 912 | Processors |
| 920, 921, 922 | Memories |
| 930 | Bus |
| 940 | Input Device |
| 950 | Output Device |
| 960 | User Interface |
| 970 | Program Carrier (computer readable device) |
| 980 | Program Signal |

What is claimed:

1. A computer-implemented method for risk evaluation in a strategic enterprise management system comprising:
providing an object estimation-value for an object, the object estimation-value representing an estimate of a first target value;
providing a risk estimation-value that represents an estimate of a risk to the first target value;
providing a risk status for a second target value; and
determining, by a computer system comprising a processor, a risk status for the first target value based on a comparison of the risk estimation-value with a predefined threshold value and based on the risk status for the second target value.

2. The computer-implemented method of claim 1, wherein the object is selected from the group comprising a strategy, a strategy-element, a perspective, an objective, a target, a key-figure and a measure.

3. The computer-implemented method of claim 1, wherein the object is a component of a score-card.

4. The computer-implemented method of claim 1, wherein the risk to the first target value is a component of a risk-catalogue.

5. The computer-implemented method of claim 3, wherein the score-card provides at least one further object that has a hierarchical relationship with the object so that the object is a child of the further object.

6. The computer-implemented method of claim 1, wherein the risk status for the first target value is further determined by using a rule-set.

7. The computer-implemented method of claim 6, wherein the rule-set comprises rules selected from the group comprising adding, subtracting, averaging, weighted averaging and comparing to a threshold value.

8. The computer-implemented method of claim 5, wherein the further object is selected from the group comprising a strategy, a strategy-element, a perspective, an objective, a target, a key-figure and a measure.

9. A risk evaluation system used in strategic enterprise management comprising:
means for providing an object estimation-value for an object, the object estimation-value representing an estimate of a first target value;
means for providing a risk estimation-value that represents an estimate of a risk to the first target value;
means for providing a risk status for a second target value; and
means for determining a risk status for the first target value based on a comparison of the risk estimation-value with a predefined threshold value and based on the risk status for the second target value.

10. The system of claim 9, wherein the object is selected from the group comprising a strategy, a strategy-element, a perspective, an objective, a target, a key-figure and a measure.

11. A computer program product for risk evaluation in strategic enterprise management embodied in a non-transitory computer readable medium, the computer program product comprising instructions for execution by a processor of a computer to:

provide an object estimation-value for an object, the object estimation-value representing an estimate of a first target value;

provide a risk estimation-value that represents an estimate of a risk to the first target value;

provide a risk status for a second target value; and determine a risk status for the first target value based on a comparison of the risk estimation-value with a predetermined threshold value and based on the risk status for the second target value.

12. The computer program product of claim 11, wherein the object is selected from the group comprising a strategy, a strategy-element, a perspective, an objective, a target, a key-figure and a measure.

* * * * *